(12) United States Patent
Cai

(10) Patent No.: US 11,554,833 B2
(45) Date of Patent: Jan. 17, 2023

(54) AUXILIARY POWER DEVICE FOR USE WITH A BICYCLE

(71) Applicant: Elite Energy Co., Ltd., Taichung (TW)

(72) Inventor: Yi-Shan Cai, Taichung (TW)

(73) Assignee: Elite Energy Co., Ltd., Taichung (TW)

( * ) Notice: Subject to any disclaimer, the term of this patent is extended or adjusted under 35 U.S.C. 154(b) by 6 days.

(21) Appl. No.: 17/197,205

(22) Filed: Mar. 10, 2021

(65) Prior Publication Data

US 2021/0284283 A1 Sep. 16, 2021

(30) Foreign Application Priority Data

Mar. 12, 2020 (TW) .................................. 109108204

(51) Int. Cl.
*B62M 11/04* (2006.01)
*B62M 6/55* (2010.01)
*B62M 11/10* (2006.01)

(52) U.S. Cl.
CPC .............. *B62M 11/04* (2013.01); *B62M 6/55* (2013.01)

(58) Field of Classification Search
CPC .......... B62M 6/55; B62M 6/20; B62M 11/04; B62M 11/10
See application file for complete search history.

(56) References Cited

U.S. PATENT DOCUMENTS

| | | | | |
|---|---|---|---|---|
| 5,901,807 A | * | 5/1999 | Tseng | B62M 11/145 180/220 |
| 6,554,730 B1 | * | 4/2003 | Sakai | B62M 6/55 475/195 |
| 8,418,584 B2 | | 4/2013 | Huang | |
| 11,167,817 B2 | * | 11/2021 | Noda | B62M 9/10 |
| 11,292,553 B2 | * | 4/2022 | Li | B62M 23/02 |
| 2015/0210349 A1 | * | 7/2015 | Liu | B62M 6/55 180/206.4 |
| 2016/0339991 A1 | * | 11/2016 | Adams | B60B 27/023 |
| 2019/0308686 A1 | * | 10/2019 | Hendey | B62J 1/08 |

FOREIGN PATENT DOCUMENTS

| | | |
|---|---|---|
| CN | 1113048 A | 12/1995 |
| EP | 0636536 A1 | 2/1995 |
| TW | 335003 U | 6/1998 |
| TW | I426035 B | 2/2014 |

OTHER PUBLICATIONS

Search Report issued to European counterpart application No. 21161274.2 by the EPO dated Jul. 13, 2021.
Search Report appended to an Office Action, which was issued to Taiwanese counterpart application No. 109108204 by the TIPO dated May 5, 2021, with an English translation thereof.

* cited by examiner

*Primary Examiner* — Anne Marie M Boehler

(74) *Attorney, Agent, or Firm* — The Webb Law Firm

(57) ABSTRACT

An auxiliary power device adapted for use with a bicycle includes a drive unit, first and second one-way transmissions that are adapted to be mounted in a bike frame of the bicycle, a crankshaft and a transmission sprocket. The first one-way transmission is connected between the drive unit and the transmission sprocket. The second one-way transmission is mounted between the crankshaft and the transmission sprocket. When rotation of the transmission sprocket is driven by the drive unit via the first one-way transmission, the second one-way transmission is idling. When rotation of the transmission sprocket is driven by the crankshaft via the second one-way transmission, the first one-way transmission is idling.

2 Claims, 2 Drawing Sheets

AUXILIARY POWER DEVICE FOR USE WITH A BICYCLE

CROSS-REFERENCE TO RELATED APPLICATION

This application claims priority to Taiwanese Patent Application No. 109108204, filed Mar. 12, 2020, the disclosure of which is hereby incorporated by reference in its entirety.

BACKGROUND

Field of the Disclosure

The disclosure relates to a bicycle, and more particularly to an auxiliary power device for use with a bicycle.

Description of Related Art

In order to reduce loading on a cyclist, various conventional devices of prior art have disclosed technologies that use power provided by a motor to assist the cyclist in pedaling when necessary. In addition, to better meet the needs of the cyclist, various sensing technologies are successively disclosed, through which pedaling forces or torques exerted to a bicycle are measured in real time to determine whether to provide assistance to the cyclist.

Some of the above-mentioned technologies are able to use inner spaces of a bottom bracket shell, a seat tube and/or a down tube of a bicycle frame to accommodate a motor, a deceleration mechanism and a transmission mechanism without changing the original configuration or design of a bicycle frame, as well as avoiding a need to increase the dimensions of the bicycle. However, in terms of power transmission, such technologies are still in development and there is still room for improvement.

Moreover, in order to prevent the pedaling forces from being fed back to the motor, a conventional driving device disclosed in Taiwanese Patent No. 1426035 includes: a first one-way bearing that is mounted between a sprocket and a motor such that the motor drives the sprocket to rotate via the first one-way bearing; and a second one-way bearing that is mounted between the sprocket and a crankshaft such that the crankshaft, when driven by the cyclist, drives the sprocket to rotate via the second one-way bearing without feeding the pedaling forces back to the motor. However, the first and second one-way bearings of such conventional driving device are susceptible to build-ups of moisture, dust and dirt which can easily compromise operation of the driving device, and thus are in need of improvement.

SUMMARY

Therefore, the object of the disclosure is to provide an auxiliary power device for use with a bicycle that can alleviate at least one of the drawbacks of the prior art.

According to the disclosure, an auxiliary power device is adapted for use with a bicycle. The bicycle includes a bike frame. The bike frame has an upright receiving space and a horizontal shaft hole that extends along a shaft axis and that is transversely and spatially communicated with a lower end of the receiving space such that the receiving space and the shaft hole form an inverted T-shape. The auxiliary power device includes a drive unit, a transmission unit, a crank unit, a second one-way transmission and a transmission sprocket. The drive unit is adapted to be mounted in the receiving space. The transmission unit includes a first gear, a first one-way transmission and a second gear. The first gear is adapted to be rotatably mounted in the receiving space. The first one-way transmission is sleeved on and interconnects the drive unit and the first gear such that the first gear is rotatable by the drive unit. The second gear is adapted to be rotatably mounted in the shaft hole, and meshes with the first gear such that the second gear is drivable by the drive unit to rotate about the shaft axis. The crank unit includes a crankshaft, a first crank and a second crank. The crankshaft is adapted to be rotatably mounted in the shaft hole, and extends along the shaft axis through the second gear. The first crank is connected to one of opposite ends of the crankshaft which are opposite along the shaft axis. The second crank is connected to the other one of the opposite ends of the crankshaft. The second one-way transmission is mounted between the second gear and the crankshaft such that the second gear is further drivable by the crankshaft to rotate about the shaft axis. The transmission sprocket is rotatably sleeved on the crankshaft, is connected to the second gear, and is co-rotatable with the second gear about the shaft axis. When rotation of the transmission sprocket is driven by the drive unit via the first one-way transmission, the second one-way transmission is idling. When rotation of the transmission sprocket is driven by the crankshaft of the crank unit via the second one-way transmission, the first one-way transmission is idling.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
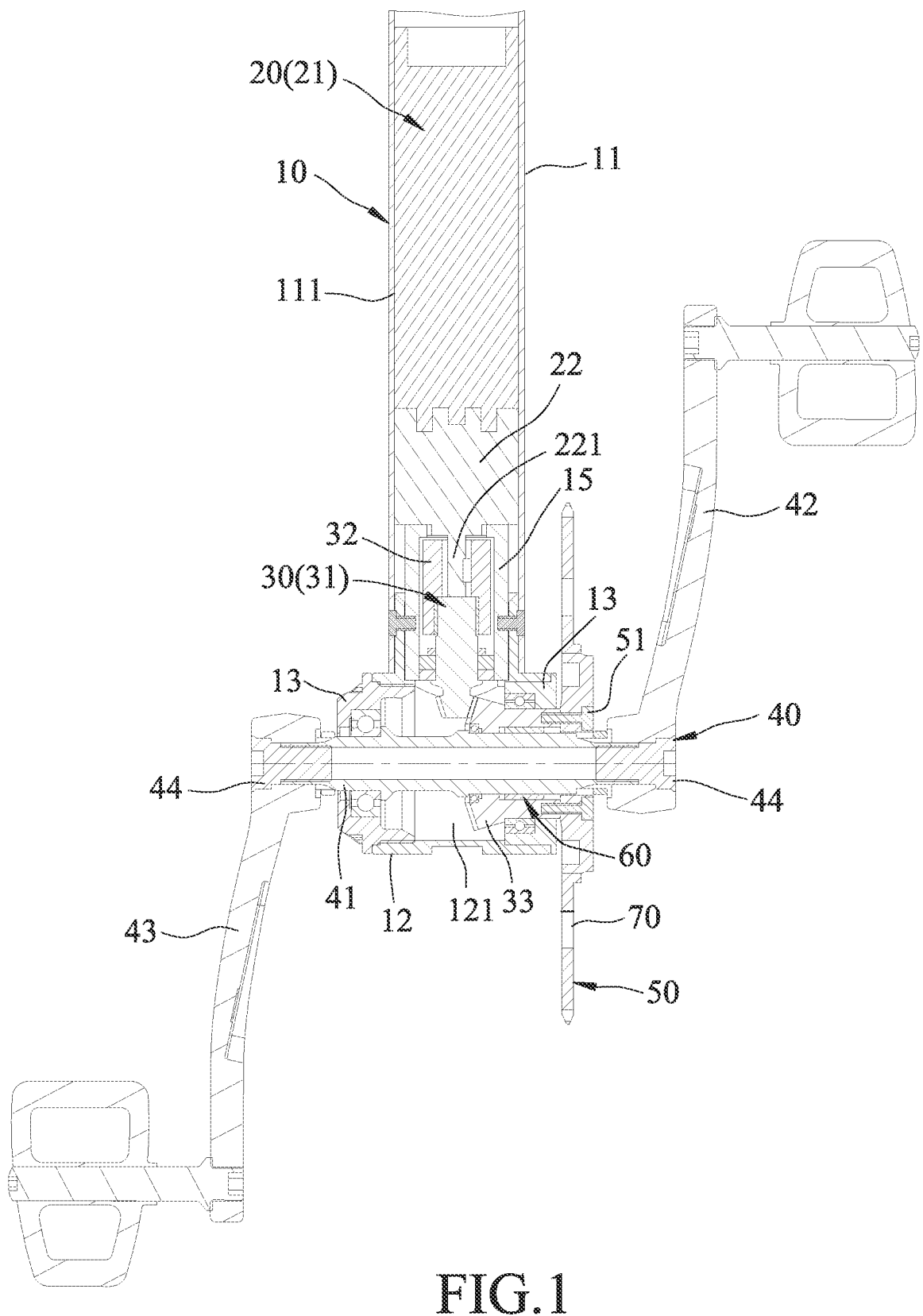
FIG. 1 is a sectional view of an embodiment of an auxiliary power device according to the disclosure.
Figure 2:
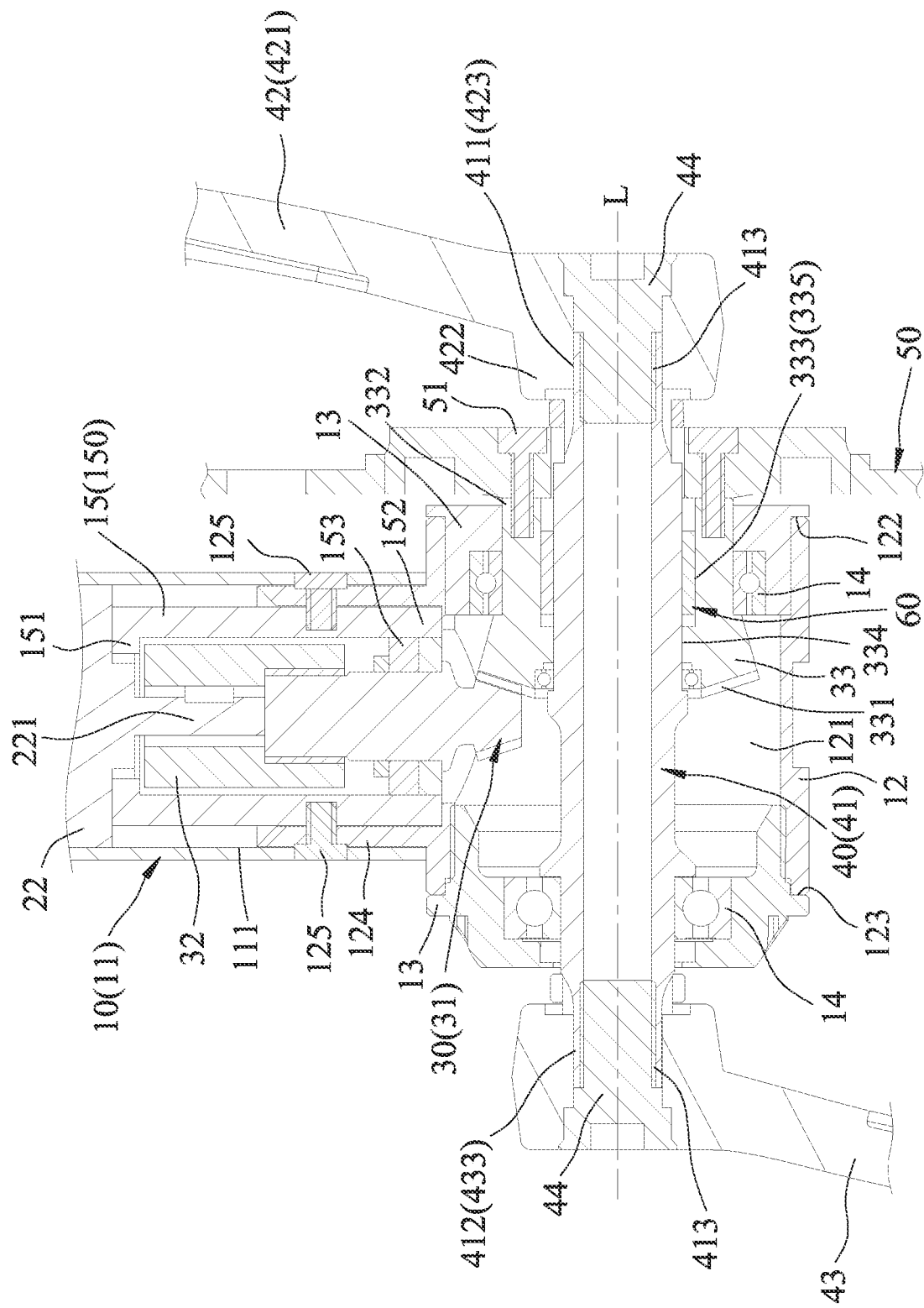
FIG. 2 is an enlarged view of a portion of FIG. 1.

Referring to FIGS. 1 and 2, an auxiliary power device according to the disclosure is adapted for use with a bicycle that includes a bike frame 10. The auxiliary power device includes a drive unit 20, a transmission unit 30, a crank unit 40, a transmission sprocket 50, a second one-way transmission 60 and a sensor 70.

The bike frame 10 has a seat tube 11, a shaft tube 12, two end caps 13, two main bearings 14, and a sleeve member 15.

The seat tube 11 defines an upright receiving space 111. The shaft tube 12 extends along a shaft axis (L), defines a horizontal shaft hole 121 that also extends along the shaft axis (L), and is transversely connected to the seat tube 11 so as to form an inverted T-shape. The end caps 13 are respectively connected to opposite ends of the shaft tube 12. The main bearings 14 are respectively mounted in the end caps 13. The sleeve member 15 is mounted in the receiving space 111 of the seat tube 11.

Specifically, the shaft hole 121 is transversely and spatially communicated with a lower end of the receiving space 111 such that the receiving space 111 and the shaft hole 121 also form an inverted T-shape. The shaft tube 12 has a first end surface 122 and a second end surface 123 that are opposite to each other along the shaft axis (L). The end caps 13 cover respectively the first and second end surfaces 122, 123 of the shaft tube 12. In addition, the shaft tube 12 is formed with an upright hollow protruding portion 124 that protrudes from an outer surface thereof, and that extends into the receiving space 111 of the seat tube 11. The protruding portion 124 and the sleeve member 15 are fixed to the seat tube 11 by a plurality of screws 125. The sleeve member 15 is a hollow tube, and includes a tubular sleeve body 150 that has a first sleeve end 151 and a second sleeve end 152, and a sealing plate 153 that is sealingly connected to an inner surface of the sleeve body 150 and that is proximate to the second sleeve end 152. It should be noted that, in the present disclosure, only the seat tube 11 and the shaft tube 12 of the bike frame 10 are disclosed; however, the bike frame 10 further has a head tube, a top tube, a down tube, and so forth (not shown).

The drive unit 20 is adapted to be mounted in the receiving space 111 of the seat tube 11, and includes a motor 21 and a speed reducer 22 that is drivable by the motor 21. The speed reducer 22 has a transmission shaft 221 that outputs power of the motor 21. The first end 151 of the sleeve member 15 abuts against a lower end of the speed reducer 22.

The transmission unit 30 includes a first gear 31, a first one-way transmission 32 and a second gear 33.

The first gear 31 is adapted to be rotatably mounted in the receiving space 111 of the seat tube 11. The first one-way transmission 32 is sleeved on and interconnects the first gear 31 and the transmission shaft 221 of the drive unit 20 such that the first gear 31 is rotatable by the drive unit 20. The second gear 33 is adapted to be rotatably mounted in the shaft hole 121 of the shaft tube 12, is supported by one of the main bearings 14 (i.e., the one of the main bearings 14 is sleeved on the second gear 33), and meshes with the first gear 31 such that the second gear 33 is drivable by the drive unit 20 to rotate about the shaft axis (L). In the present embodiment, the first and second gears 31, 32 are bevel gears. An upper portion of the first gear 31 and the first one-way transmission 32 are received in the sleeved member 15, and the first one-way transmission 32 is concealed in the sleeved member 15 by the sealing plate 153 for water and dust proofing.

The second gear 33 has a toothed end portion 331, a connecting portion 332, and an inner hole 333 that extends through the toothed end portion 331 and the connecting portion 332. The connecting portion 332 is opposite to the toothed end portion 331 along the shaft axis (L), is adapted to protrude outwardly from the first end surface 122 of the shaft tube 12 and a corresponding one of the end caps 13, and is connected to the transmission sprocket 50. The inner hole 333 is stepped, and has a small diameter section 334 and a large diameter section 335 that are connected together and that are respectively proximate to and distal from the toothed end portion 331. As such, the power of the motor 21 is transferable to the first and second gears 31, 33 via the first one-way transmission 32 without being fed back to the motor 21.

The crank unit 40 includes a crankshaft 41, a first crank 42, a second crank 43 and two fastening members 44.

The crankshaft 41 is adapted to be rotatably mounted in the shaft hole 121 of the shaft tube 12, and extends along the shaft axis (L) through the second gear 33 (i.e., the crankshaft 41 is received in the inner hole 333 of the second gear 33). The first crank 42 is connected to one of opposite ends of the crankshaft 41 which are opposite along the shaft axis (L). The second crank 43 is connected to the other one of the opposite ends of the crankshaft 41. The first and second cranks 42, 43 are adapted to be proximate respectively to the first and second end surfaces 122, 123 of the shaft tube 12. Each of the fastening members 44 fastens a respective one of the first and second cranks 42, 43 to the crankshaft 41.

Specifically, the crankshaft 41 extends through the inner hole 333 of the second gear 33 and the main bearings 14, is connected fixedly to the second gear 33 and connected to the right one of the main bearings 14, and has a first linking portion 411, a second linking portion 412 and two threaded holes 413. The first linking portion 411 and the second linking portion 412 are opposite to each other along the shaft axis (L). The first linking portion 411 protrudes outwardly from the second gear 33. Each of the threaded holes 413 is formed in a respective one of the first and second linking portions 411, 412.

The first crank 42 is fixed to the first linking portion 411, is disposed next to the second gear 33, and has an arm segment 421, a linking segment 422 and a linking hole 423. The linking segment 422 is connected to the arm segment 421 along the shaft axis (L), and is proximate to the second gear 33. The linking hole 423 extends through the arm segment 421 and the linking segment 422. The first linking portion 411 of the crankshaft 41 is non-rotatably received in the linking hole 423.

The second crank 43 is fixed to the second linking portion 412, and also has a linking hole 433. The second linking portion 412 of the crankshaft 41 is non-rotatably received in the linking hole 433 of the second crank 43.

Each of the fastening members 44 extends through a respective one of the linking holes 423, 433 of the first and second cranks 42, 43, and threadedly engages a respective one of the threaded holes 413 of the crankshaft 41.

The second one-way transmission 60 is mounted between the second gear 33 and the crankshaft 41 and is mounted in the large diameter section 335 of the inner hole 333 of the second gear 33, such that the second gear 33 is further drivable by the crankshaft 41 to rotate about the shaft axis (L). In the present embodiment, the second one-way transmission 60 is a one-way needle roller bearing. When the first crank 42 and the second crank 43 are driven by pedaling of the user, the crankshaft 41 drives the transmission sprocket 50 to rotate in a predetermined direction via the second one-way transmission 60, and the first one-way transmission 32 is idling.

The transmission sprocket 50 is rotatably sleeved on and spaced apart from the crankshaft 41, is fixedly connected to the connecting portion 332 of the second gear 33 via a plurality of screws 51, and is co-rotatable with the second gear 33 about the shaft axis (L). It should be noted that, when rotation of the transmission sprocket 50 is driven by the drive unit 20 via the first one-way transmission 32, the first gear 31 and the second gear 33, the second one-way transmission 60 is idling, and when rotation of the transmission sprocket 50 is driven by the crankshaft 41 of the crank unit 40 via the second one-way transmission 60 and the second gear 33, the first one-way transmission 32 is idling.

The sensor 70 is mounted to one of the crank unit 40 and the transmission sprocket 50. In the present embodiment, as shown in FIG. 1, the sensor 70 is mounted to the transmission sprocket 50 for measuring pedaling torques and for transmitting signals to the motor 21, which is electrically connected thereto, so as to adjust the power output of the motor 21 for assisting the user.

In an operation of the present embodiment, when the motor 21 starts running, the power of the motor 21 is transmitted to the first gear 31 via the first one-way transmission 32, and, by virtue of the first gear 31 meshing with the second gear 33 and the second gear 33 being fixedly connected to the transmission sprocket 50, the transmission sprocket 50 is in turn driven thereby to rotate and move the bicycle forwardly. During this time, the second one-way transmission 60 is idling and the first crank 42 and the second crank 43 are not rotated thereby, therefore ensuring the safety of the user.

When there is no power output from the motor 21, and when the user starts pedaling (i.e., turning the first crank 42 and the second crank 43), rotation of the crankshaft 41 is transferred to the second gear 33 by the second one-way transmission 60 and, as mentioned, by virtue of the second gear 33 being fixedly connected to the transmission sprocket 50, the transmission sprocket 50 is rotated thereby in the predetermined direction. During this time, the first one-way transmission 32 is idling and does not feed power back to the motor 21. Therefore, when the first crank 42 and the second crank 43 are driven by pedaling, no effort of the user is wasted in order to overcome resistance of the motor 21.

Furthermore, by using the sensor 70 mounted to the crank unit 40 or the transmission sprocket 50, the rotation of the crankshaft 41 is detected when the first crank 42 and the second crank 43 are driven by pedaling of the user. For example, after the first crank 42 and the second crank 43 are turned for several revolutions or seconds, an electrical signal is transmitted so as to actuate operation of the motor 21. Therefore, by virtue of the above-mentioned configuration, if the user needs the motor 21 to assist in pedaling or to drive the bicycle forward, he/she may turn the first crank 42 and the second crank 43 for a few revolutions or seconds, and the motor 21 will be actuated by the sensor 70. Also, since the motor 21 may operate independently from movements of the first crank 42 and the second crank 43 as mentioned, unless the sensor 70 is involved, the movements of the first crank 42 and the second crank 43 during pedaling do not interfere with the operation of the motor 21.

Therefore, by virtue of the configuration of the present embodiment, the crank unit 40 and the motor 21 may operate independently from each other regardless of whether the bicycle is being driven by pedaling (i.e., by movement of the crank unit 40) or the power of the motor 21. In addition, the operation of the motor 21 can be ceased by a brake system (not shown) of the bicycle, and when the motor 21 is out of power, the user can still ride the bicycle as riding a regular bicycle. Moreover, since the motor 21 is controlled by the sensor 70, dangers that may arise from excessive speed of the motor 21 can be avoided and the safety of the user is ensured.

In summary, the present embodiment of the auxiliary power device according to the disclosure can achieve the following effects.

1. By virtue of the second one-way transmission 60 being mounted between the second gear 33 and the crankshaft 41, and the second gear 33 and the transmission sprocket 50 being fixedly connected, the overall structure of the present embodiment is simpler and more compact than that of the prior art described in the background section.

2. By virtue of the first one-way transmission 32 and the second one-way transmission 60 being disposed and concealed in the bike frame 10, build-ups of moisture, dust and dirt can be prevented, which ensures a smooth operation of power transmission, and furthermore prolongs the service lives of the first and second one-way transmissions 32, 60.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An auxiliary power device adapted for use with a bicycle, the bicycle including a bike frame, the bike frame having an upright receiving space and a horizontal shaft hole that extends along a shaft axis and that is transversely and spatially communicated with a lower end of the receiving space such that the receiving space and the shaft hole form an inverted T-shape, the bike frame further comprising a seat tube that defines the receiving space, and a shaft tube that extends along the shaft axis, that defines the shaft hole, and that is transversely connected to the seat tube so as to form the inverted T-shape, the shaft tube having first and second end surfaces that are opposite to each other along the shaft axis, said auxiliary power device comprising:
a drive unit adapted to be mounted in the receiving space;
a transmission unit comprising:
a first gear that is adapted to be rotatably mounted in the receiving space,
a first one-way transmission that is sleeved on and interconnects said drive unit and said first gear such that said first gear is rotatable by said drive unit, and
a second gear that is adapted to be rotatably mounted in the shaft hole, and that meshes with said first gear such that said second gear is drivable by said drive unit to rotate about the shaft axis;
a crank unit comprising:
a crankshaft that is adapted to be rotatably mounted in the shaft hole, and that extends along the shaft axis through said second gear,
a first crank that is connected to one of opposite ends of said crankshaft which are opposite along the shaft axis, and
a second crank that is connected to the other one of said opposite ends of said crankshaft;
a second one-way transmission mounted between said second gear and said crankshaft such that said second gear is further drivable by said crankshaft to rotate about the shaft axis; and
a transmission sprocket rotatably sleeved on said crankshaft, connected to said second gear, and co-rotatable with said second gear about the shaft axis,
wherein, when rotation of said transmission sprocket is driven by said drive unit via said first one-way transmission, said second one-way transmission is idling,
wherein, when rotation of said transmission sprocket is driven by said crankshaft of said crank unit via said second one-way transmission, said first one-way transmission is idling, wherein said first and second cranks are adapted to be proximate respectively to the first and second end surfaces of the shaft tube, wherein said second gear has a connecting portion that is adapted to protrude outwardly from the first end surface of the shaft tube, and that is connected fixedly to said transmission sprocket, wherein said second gear of said transmission unit further comprises:

a toothed end portion that is opposite to said connecting portion along the shaft axis; and an inner hole that extends through said connecting portion and said toothed end portion along the shaft axis for receiving said crankshaft, said inner hole being stepped and having a small diameter section and a large diameter section that are respectively proximate to and distal from said toothed end portion, said second one-way transmission being mounted in said large diameter section, and wherein said large diameter section of said inner hole of said second gear has an open end that is distal from said toothed end portion, said open end of said large diameter section being configured to be concealed by said transmission sprocket when said transmission sprocket is connected to said second gear, and be exposed to an external environment when said transmission sprocket is removed from said second gear.

2. The auxiliary power device as claimed in claim 1, wherein the second one-way transmission is a one-way needle roller bearing.

* * * * *